(12) United States Patent
Wang et al.

(10) Patent No.: US 10,968,730 B2
(45) Date of Patent: Apr. 6, 2021

(54) METHOD OF OPTIMIZING DRILLING RAMP-UP

(71) Applicants: Lei Wang, The Woodlands, TX (US); Gregory S. Payette, Spring, TX (US); Jeffrey R. Bailey, Houston, TX (US); Jeff H. Moss, The Woodlands, TX (US)

(72) Inventors: Lei Wang, The Woodlands, TX (US); Gregory S. Payette, Spring, TX (US); Jeffrey R. Bailey, Houston, TX (US); Jeff H. Moss, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 173 days.

(21) Appl. No.: 16/017,484

(22) Filed: Jun. 25, 2018

(65) Prior Publication Data

US 2019/0032467 A1    Jan. 31, 2019

Related U.S. Application Data

(60) Provisional application No. 62/536,819, filed on Jul. 25, 2017.

(51) Int. Cl.
*E21B 44/02* (2006.01)
*E21B 44/04* (2006.01)
(Continued)

(52) U.S. Cl.
CPC .............. *E21B 44/04* (2013.01); *E21B 21/08* (2013.01); *E21B 44/02* (2013.01); *E21B 45/00* (2013.01); *G06Q 30/0283* (2013.01); *E21B 7/04* (2013.01)

(58) Field of Classification Search
CPC ............ E21B 44/00; E21B 44/02; E21B 44/04
See application file for complete search history.

(56) References Cited

U.S. PATENT DOCUMENTS

| | | | |
|---|---|---|---|
| 2,671,346 A * | 3/1954 | Banning, Jr. ........... | E21B 47/04 73/152.44 |
| 4,507,735 A | 3/1985 | Moorehead et al. | |
| | (Continued) | | |

OTHER PUBLICATIONS

Bourgoyne et al., Applied Drilling Engineering, SPE Textbook Series, vol. 2, Richardson, TX, USA, 1991, pp. 226-229.
(Continued)

*Primary Examiner* — Kenneth L Thompson
(74) *Attorney, Agent, or Firm* — ExxonMobil Upstream Research Company—Law Department

(57) ABSTRACT

A method of optimizing drilling ramp-up is provided herein. More specifically, a method of ramping up a drilling operation from a static condition (0, 0) to optimum drilling parameter values (WOB*, RPM*) is provided. The method includes identifying a set of drilling control variables used in forming the wellbore. Examples include weight-on-bit (WOB) and rate of penetration (RPM). The method additionally includes selecting desired control variable values for a first identified drilling stage. The values may be generically referred to as $(V_1, V_2)$. The method also includes increasing the drilling control variables from (0, 0) to pre-defined drilling control variable values $(V_1, V_2)$. Preferably, $V_1$ is a WOB value while $V_2$ is a rotation speed value (RPM). The method also comprises monitoring a performance index (PI), wherein (PI) is a combination of torque (TQ) and penetration rate (RPM). The method then includes determining an optimal path to optimum drilling parameter values (WOB*, RPM*) using the Performance Index (PI).

16 Claims, 6 Drawing Sheets

(51) Int. Cl.
  *E21B 21/08* (2006.01)
  *G06Q 30/02* (2012.01)
  *E21B 45/00* (2006.01)
  *E21B 7/04* (2006.01)

(56) References Cited

U.S. PATENT DOCUMENTS

| | | | |
|---|---|---|---|
| 4,736,297 A | 4/1988 | LeJeune | |
| 5,551,286 A | 9/1996 | Booer | |
| 5,730,234 A | 3/1998 | Putot | |
| 5,794,720 A * | 8/1998 | Smith | E21B 12/02 175/40 |
| 5,842,149 A | 11/1998 | Harrell et al. | |
| 6,026,912 A | 2/2000 | King et al. | |
| 6,155,357 A | 12/2000 | King et al. | |
| 6,192,998 B1 | 2/2001 | Pinckard | |
| 6,293,356 B1 | 9/2001 | King et al. | |
| 6,382,331 B1 | 5/2002 | Pinckard | |
| 6,408,953 B1 * | 6/2002 | Goldman | E21B 12/02 175/39 |
| 6,424,919 B1 | 7/2002 | Moran et al. | |
| 6,443,242 B1 | 9/2002 | Newman et al. | |
| 6,480,118 B1 | 11/2002 | Rao | |
| 6,732,052 B2 | 5/2004 | Macdonald et al. | |
| 6,820,702 B2 | 11/2004 | Niedermayr et al. | |
| 6,892,812 B2 | 5/2005 | Niedermayr et al. | |
| 6,968,909 B2 | 11/2005 | Aldred et al. | |
| 7,020,597 B2 | 3/2006 | Oliver et al. | |
| 7,085,696 B2 * | 8/2006 | King | E21B 7/00 703/10 |
| 7,172,037 B2 | 2/2007 | Dashevskiy et al. | |
| 7,261,167 B2 | 8/2007 | Goldman et al. | |
| 7,316,278 B2 | 1/2008 | Hutchinson | |
| 7,357,196 B2 | 4/2008 | Goldman et al. | |
| 7,546,884 B2 * | 6/2009 | Veeningen | E21B 7/04 175/40 |
| 7,606,666 B2 | 10/2009 | Repin et al. | |
| 7,610,251 B2 | 10/2009 | Shayegi et al. | |
| 7,878,268 B2 | 2/2011 | Chapman et al. | |
| 7,896,105 B2 | 3/2011 | Dupriest | |
| 8,014,987 B2 | 9/2011 | Pabon et al. | |
| 8,949,098 B2 * | 2/2015 | King | E21B 12/02 703/10 |
| 9,074,455 B2 * | 7/2015 | Pilgrim | E21B 19/00 |
| 9,436,173 B2 | 9/2016 | Wang et al. | |
| 9,482,055 B2 * | 11/2016 | Huang | E21B 44/00 |
| 9,482,084 B2 | 11/2016 | Chang et al. | |
| 9,970,266 B2 * | 5/2018 | Marx | E21B 44/00 |
| 2001/0042642 A1 * | 11/2001 | King | E21B 7/00 175/40 |
| 2003/0015351 A1 * | 1/2003 | Goldman | E21B 12/02 175/39 |
| 2004/0256152 A1 * | 12/2004 | Dashevskiy | E21B 44/00 175/25 |
| 2009/0089227 A1 | 4/2009 | Sturrock et al. | |
| 2009/0090555 A1 | 4/2009 | Boone et al. | |
| 2009/0132458 A1 | 5/2009 | Edwards et al. | |
| 2010/0108384 A1 | 5/2010 | Byreddy et al. | |

OTHER PUBLICATIONS

Ertas, et al. (2014) "Drillstring Mechanics Model for Surveillance, Root Cause Analysis, and Mitigation of Torsional Vibrations", SPE-163420-PA, Society of Petroleum Engineers, SPE Drilling & Completion, vol. 29, Issue 04, Dec. 2014, pp. 405-417.

Johancsik et al. (1984) "Torque and Drag in Directional Wells-Prediction and Measurement", SPE-11380-PA, Society of Petroleum Engineers, Journal of Petroleum Technology, vol. 36, Issue 06, Jun. 1984, pp. 987-992.

* cited by examiner

METHOD OF OPTIMIZING DRILLING RAMP-UP

STATEMENT OF RELATED APPLICATIONS

This application claims the benefit of U.S. Ser. No. 62/536,819 entitled "Method to Optimize Drilling Off-Bottom and Parameter Ramp [sic] Operations." That application was filed on Jul. 25, 2017 and is incorporated herein in its entirety by reference.

BACKGROUND OF THE INVENTION

This section is intended to introduce various aspects of the art, which may be associated with exemplary embodiments of the present invention. This discussion is believed to assist in providing a framework to facilitate a better understanding of particular aspects of the present disclosure. Accordingly, it should be understood that this section should be read in this light, and not necessarily as admissions of prior art.

Field of the Invention

The present disclosure relates to systems and methods for improving drilling operations. More specifically, the present disclosure relates to systems and methods that may be implemented in cooperation with hydrocarbon-related drilling operations to optimize drilling performance, particularly while transitioning from an off-bottom condition to an optimal on-bottom condition.

Technology in the Field of the Invention

In the drilling of oil and gas wells, a wellbore is formed using a drill bit that is urged downwardly at a lower end of a drill string. The drill bit is rotated while force is applied through the drill string and against the rock face of the formation being drilled.

Today, wellbores are frequently drilled to depths that exceed 8,000 feet. Further, according to Baker Hughes Rig Count information for the United States, well over half of all wells now being drilled include an extended horizontal section, or "leg." Such legs can be in excess of one mile, or even two miles, in length. Thus, many wells now being drilled have a "total depth" of over 13,000 feet.

The process of drilling wells of this length is very expensive. The cost of drilling wells may be considered a function of time due to the daily equipment and manpower expenses involved. As a result, drilling companies seek to decrease the amount of time it takes to form the wellbore by increasing rate of penetration, or "ROP."

Rate of penetration is normally measured in feet per minute. ROP is primarily considered to be a function of two operating conditions—weight on bit ("WOP") and rotary speed (RPM). The effect of bit weight and rotary speed has been studied and modeled over the years in an attempt to predict and improve ROP.

A basic penetration rate equation was developed in 1962 by W. C. Maurer. The equation is as follows:

$$R = \frac{K}{S^2}\left[\frac{W}{d_b} - \left(\frac{W_0}{d_b}\right)\right]^2 N$$

where: R=rate of penetration, typically in ft/hr,
K=constant of proportionality,
S=compressive strength of the rock in psi,
W=bit weight, expressed in $klb_f$,
$W_0$=threshold bit weight,
$d_b$=bit diameter, and
N=rotary speed.

Note that the exponent "2" is considered a "weight exponent." The theoretical equation of Maurer based on the weight exponent "2" can be verified using experimental data obtained at relatively low bit weight and rotary speeds. However, as weight on bit increases, the exponent value is observed to be closer to "1" than to "2." Further, changes in lithology with depth can affect the bit weight exponent.

Since 1962, additional mathematical models have been proposed to predict formation drillability. Such models integrate other variables such as coefficient of friction between the drill bit and the rock, mud weight, mud viscosity, and other factors.

A "poor man's field test" has also been developed to determine optimal conditions for rate of penetration, or "ROP." This is known as the "drill-off test" and is described in Adam T. Bourgoyne Jr., et al., *Applied Drilling Engineering*, pp. 227-229 (Society of Petroleum Engineers, 1986). The drill-off test consists of applying a large weight to the bit, and then locking the brake (to prevent the draw works from releasing the drill string) and monitoring the decrease in bit weight with time while maintaining a constant rotary speed.

As the bit turns and rock is chipped away, the WOB decays at a rate determined by the ROP and the drill string elasticity. Hook's law of elasticity can be applied to compute the amount the drill string stretches as the weight on the bit decreases and the hook load increases. In this way, the response in penetration rate to changing bit weight can be determined over a short depth interval. A log-log plot of ROP against WOB reveals Maurer's exponent relating ROP to WOB.

More recently, efforts have been made to more accurately model and/or control drilling operations by taking into account both weight-on-bit and rotary speed. U.S. Pat. Nos. 6,026,912; 6,293,356; and 6,382,331 provide models and equations for use in increasing the ROP. In the methods disclosed in these patents, the operator collects data regarding a drilling operation and identifies a single control variable that can be varied to increase the rate of penetration. In most examples, the control variable is WOB; the relationship between WOB and ROP is modeled; and the WOB is adjusted to increase the ROP.

In addition, ExxonMobil Upstream Research Company has developed its Drilling Advisory System. Aspects of the Drilling Advisory System are described in U.S. Pat. Nos. 9,482,084 and 9,436,173, each of which is incorporated herein by reference in its entirety. In one aspect, the Drilling Advisory System employs a statistical model to identify controllable drilling parameters having significant correlation to an objective function incorporating two or more drilling performance measurements.

Regardless of the technique employed, drilling workflow tools seek to optimize controllable drilling parameters such as WOB, RPM and drilling fluid flow rate. This may be done through a combination of theoretical equations, design of experiments, and actual field experience. Such field experience may include observations made on the rig while drilling the previous stand of drill pipe or observations made while drilling other wells in the same field.

It is noted that the above efforts at improving drilling performance are directed to rate of penetration while the bit is turning at its desired full rotary speed "N." Stated another way, efforts at optimizing ROP have been directed to parameters selected while the drill bit is "on bottom," making contact with the formation at speed "N."

However, much rig time is spent while the rig is not "making hole" or is otherwise below "N." Those of ordinary skill in the art will understand that in the best of circumstances, the drilling operation is not continuous. For example, drill bits will inevitably ball up and have to be cleaned, or will wear out and have to be replaced. Additionally, bottom hole assemblies can experience mechanical issues. These circumstances require that the drill string be tripped.

Further, even when the drilling company is efficiently drilling, new joints of pipe will need to be periodically added. For each joint of pipe (or each stand of pipe as the case may be), the drilling company will need to stop rotating the drill string, threadedly connect a next joint, and then "ramp up." Drilling ramp-up means that after making a connection (or connections), a driller will lower the drill string down to bottom and resume drilling.

Drilling ramp-up is an inevitable step after each connection. Of interest, it takes about 100 ramp-ups to drill a 9,000 foot-hole interval using approximately 90-foot length stands. Extended length horizontal wells will require well over 120 ramp-ups. The result is that drilling rig time incurred during ramp-ups, combined with other "off-bottom" operations such as reaming, working with a mud bucket and washing to bottom, may exceed the on bottom drill time.

During each ramp up, the driller will increase the controllable factors (WOB, RPM) from (0, 0) to a target (WOB*, RPM*). It is therefore desirable to identify a method of improving the transition from (0, 0) to (WOB*, RPM*). This means, at least in part, resuming drilling while at the same time minimizing vibrations. Minimizing vibrations reduces the risk of bit damage and improves drilling efficiency.

BRIEF SUMMARY OF THE DISCLOSURE

A method and system of optimizing drilling ramp-up are provided herein. More specifically, a method of ramping up a drilling operation from a static condition (0, 0) to a set of optimal drilling parameters (WOB*, RPM*) is provided.

The method first includes forming a wellbore through a drilling operation. The drilling operation may be conducted either on land or in a body of water. Drilling is conducted en route to a subsurface formation using a drill string and a drill bit. In one aspect, the drill bit is part of a bottom hole assembly for directional drilling.

During the drilling, the operator or driller will receive data. The data represents at least two controllable drilling parameters.

After making a drill pipe connection for the drill string, or subsequent to raising the drilling bit off-bottom, the operator or driller will begin "ramping up." This is done first by lowering the drill string to a bottom of the wellbore, thereby engaging the formation. The operator or driller then modifies values for the controllable drilling parameters from (0, 0) to a set of predefined parameter values ($V_1$, $V_2$). Examples of $V_1$ and $V_2$ include weight-on-bit (WOB) and rate of penetration (RPM). Optionally, a drilling control variable $V_1$ or $V_2$ will be fluid flow rate (FR*).

The set of predefined values ($V_1$, $V_2$) may be manually set by a drilling crew. Alternatively, they may be values determined to be acceptable from drilling a previous stand or joint of drill pipe, or values determined to be acceptable from drilling a separate well in the field or in a similar field. Alternatively, ($V_1$, $V_2$) may be values recommended from a drilling advisory system.

The method next comprises monitoring a performance index (PI) of the drilling ramp-up step, above. The performance index represents a combination of torque (TQ) and penetration rate (RPM). Preferably, the performance index comprises a cost function or an objective function.

The (PI) may be an equation that defines a vibration indicator. In its cost function form, the vibration indicator may be expressed as:

$$V = \frac{\rho_{TQ,RPM} \cdot TSE}{\mu}$$

where: V=vibration indicator,
ρ=Pearson's correlation coefficient between TQ and RPM,
TQ=torque,
RPM=rate of penetration (in revolutions per minute),
μ=bit aggressiveness coefficient, and
TSE=torsional severity estimate for downhole stick-slip.

Alternatively, the vibration indicator (or "cost function") may be expressed as:

$$V = \frac{w_1 \rho_{TQ,RPM} + w_2 TSE}{w_3 \mu}$$

where: V=vibration indicator,
ρ=Pearson's correlation coefficient between TQ and RPM,
TQ=torque,
RPM=rate of penetration (in revolutions per minute),
μ=bit aggressiveness coefficient,
TSE=torsional severity estimate for downhole stick-slip, and
$w_i$=weighting coefficient which may be defined by the driller.

The method further includes identifying optimal parameter values ($V_1$*, $V_2$*). This may be based on the performance index, wherein performance is tied to the degree of vibration present.

An additional step in the method is to identify an optimal parameter path for drilling ramp-up based on the (PI). Stated another way, the method will include identifying an optimal parameter path from (0, 0) to ($V_1$*, $V_2$*). ($V_1$*, $V_2$*) may vary from ($V_1$, $V_2$) or may not. The optimal parameter path is applied to the first drilling stage. The first drilling stage may be, for example, three or more connections, or six or more connections, or even ten or more connections.

Identifying the optimal drilling parameter values ($V_1$*, $V_2$*) for the first drilling state may comprise finding a minimum cost function value or a maximum objective function value from among different ramp-up trial paths. This is done in order to determine the optimal parameter path. In one aspect, determining the optimal parameter path comprises computing the cost function or the objective function associated with each trial path, and identifying the optimal parameter path by comparing an overall value of the cost function or the objective function associated with each path.

The method is then repeated for a second identified drilling stage. In one aspect, the identified optimal parameter values ($V_1^*, V_2^*$) from the first drilling stage, or interval, are used as a new set of predefined values ($V_1, V_2$) for drilling a second interval of the wellbore.

A system for operating a drilling rig including a cpu for controlling operational parameters of the rig is also included herein, the system including non-transitory computer readable storage media including instructions for receiving operational data and controlling the rig operational parameters according to the methods described herein.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
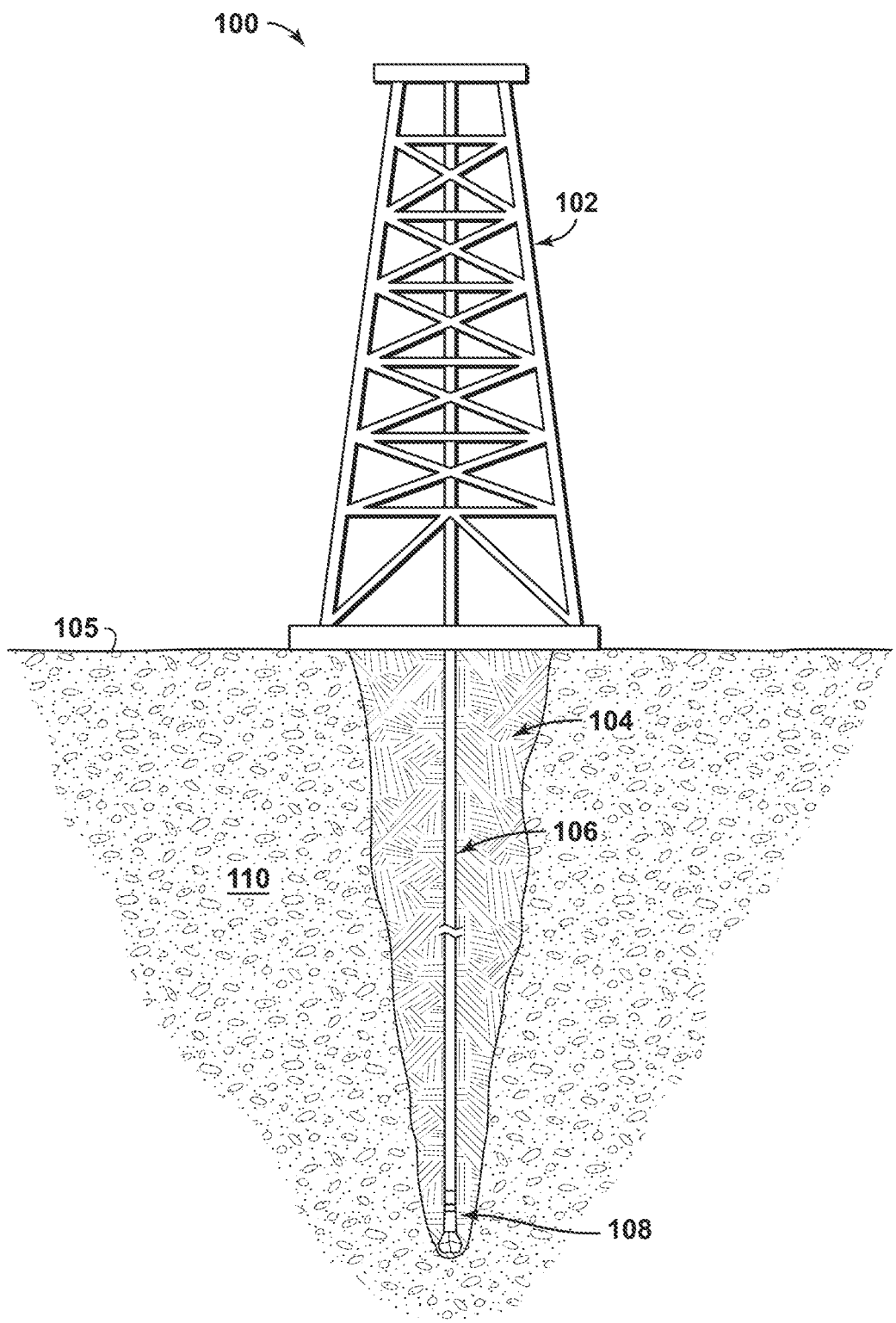
FIG. 1 is a side view of a drilling rig. The drilling rig is placed over an illustrative subsurface formation for drilling operations.

For purposes of the present application, it will be understood that the term "hydrocarbon" refers to an organic compound that includes primarily, if not exclusively, the elements hydrogen and carbon. Hydrocarbons may also include other elements, such as, but not limited to, halogens, metallic elements, nitrogen, oxygen, and/or sulfur.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient condition. Hydrocarbon fluids may include, for example, oil, natural gas, coalbed methane, shale oil, pyrolysis oil, pyrolysis gas, a pyrolysis product of coal, and other hydrocarbons that are in a gaseous or liquid state, or combination thereof.

As used herein, the terms "produced fluids," "reservoir fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, oil, natural gas, pyrolyzed shale oil, synthesis gas, a pyrolysis product of coal, oxygen, carbon dioxide, hydrogen sulfide and water.

As used herein, the term "fluid" refers to gases, liquids, and combinations of gases and liquids, as well as to combinations of gases and solids, combinations of liquids and solids, and combinations of gases, liquids, and solids.

As used herein, the term "wellbore fluids" means water, hydrocarbon fluids, formation fluids, or any other fluids that may be within a wellbore during a production operation.

As used herein, the term "gas" refers to a fluid that is in its vapor phase. A gas may be referred to herein as a "compressible fluid." In contrast, a fluid that is in its liquid phase is an "incompressible fluid."

As used herein, the term "subsurface" refers to geologic strata occurring below the earth's surface.

As used herein, the term "formation" refers to any definable subsurface region regardless of size. The formation may contain one or more hydrocarbon-containing layers, one or more non-hydrocarbon containing layers, an overburden, and/or an underburden of any geologic formation. A formation can refer to a single set of related geologic strata of a specific rock type, or to a set of geologic strata of different rock types that contribute to or are encountered in, for example, without limitation, (i) the creation, generation and/or entrapment of hydrocarbons or minerals, and (ii) the execution of processes used to extract hydrocarbons or minerals from the subsurface.

As used herein, the term "wellbore" refers to a hole in the subsurface made by drilling or insertion of a conduit into the subsurface. A wellbore may have a substantially circular cross section. The term "well," when referring to an opening in the formation, may be used interchangeably with the term "wellbore."

DESCRIPTION OF SELECTED SPECIFIC EMBODIMENTS

FIG. 1 is a side view of a known drill site 100. The drill site 100 includes a drilling rig 102 extending up from an earth surface 105. As illustrated, the drill site 100 is a land-based drill site having a drilling rig 102 forming a wellbore 104 on land. The drilling rig 102 includes a drill string 106 having a drill bit 108 disposed at the end thereof.

It is understood that the drill bit 108 may and likely is a bottom hole assembly, or so-called BHA. In this instance, the drill bit 108 will include one or more orientation sensors, a steering unit configured to direct a force through the drill bit and against a rock formation, control electronics designed to send control signals to the steering unit, and power electronics. A communications system such as an acoustic system, EM system or microwave system will communicate information concerning location and orientation from the BHA back to the surface.

The drilling rig 102 and related components are illustrated in FIG. 1 in generally schematic form to show general context. It is understood, however, that the present methods may be used in connection with any currently available drilling equipment and is expected to be usable with any future developed drilling equipment. Similarly, the drilling methods disclosed herein are not limited to land-based drilling sites, but may be used in connection with offshore, deep water, arctic, and other environments in which drilling operations are conducted in water.

As drilling operations progress, the drill bit 108 advances through the formation 110 at a rate known as the rate of penetration, or "RPM." RPM is commonly calculated as the measured depth drilled over time. As the drill bit 108 moves through the formation 110, formation conditions will change. Such conditions will include subsurface pore pressure, temperature and rock lithology. Moreover, the drilling conditions may change in manners that reduce the efficiencies of the drilling operation and/or that create less preferred operating conditions. Such conditions include torque, coefficient of friction between the bit and rock face, vibration, and other things. As can be understood, some of these parameters are controllable and others are not.

As described above, it is desirable to optimize drilling operation during ramp-up. Drilling ramp up refers to the process where the driller lowers a BHA, initially from a suspended state where the drill bit is off-bottom, back to the bottom of a wellbore to initiate or, more frequently, to continue a drilling operation. Therefore, the ramp-up process includes both off-bottom and on-bottom steps, wherein the operating parameters transition from (0, 0) off-bottom values to optimal on-bottom values $(V_1^*, V_2^*)$. As an aside, ramp-down is the reverse of ramp-up, i.e., it is the process of transitioning from optimized on-bottom drilling parameters back to (0, 0) along an optimized path.

Figure 2:
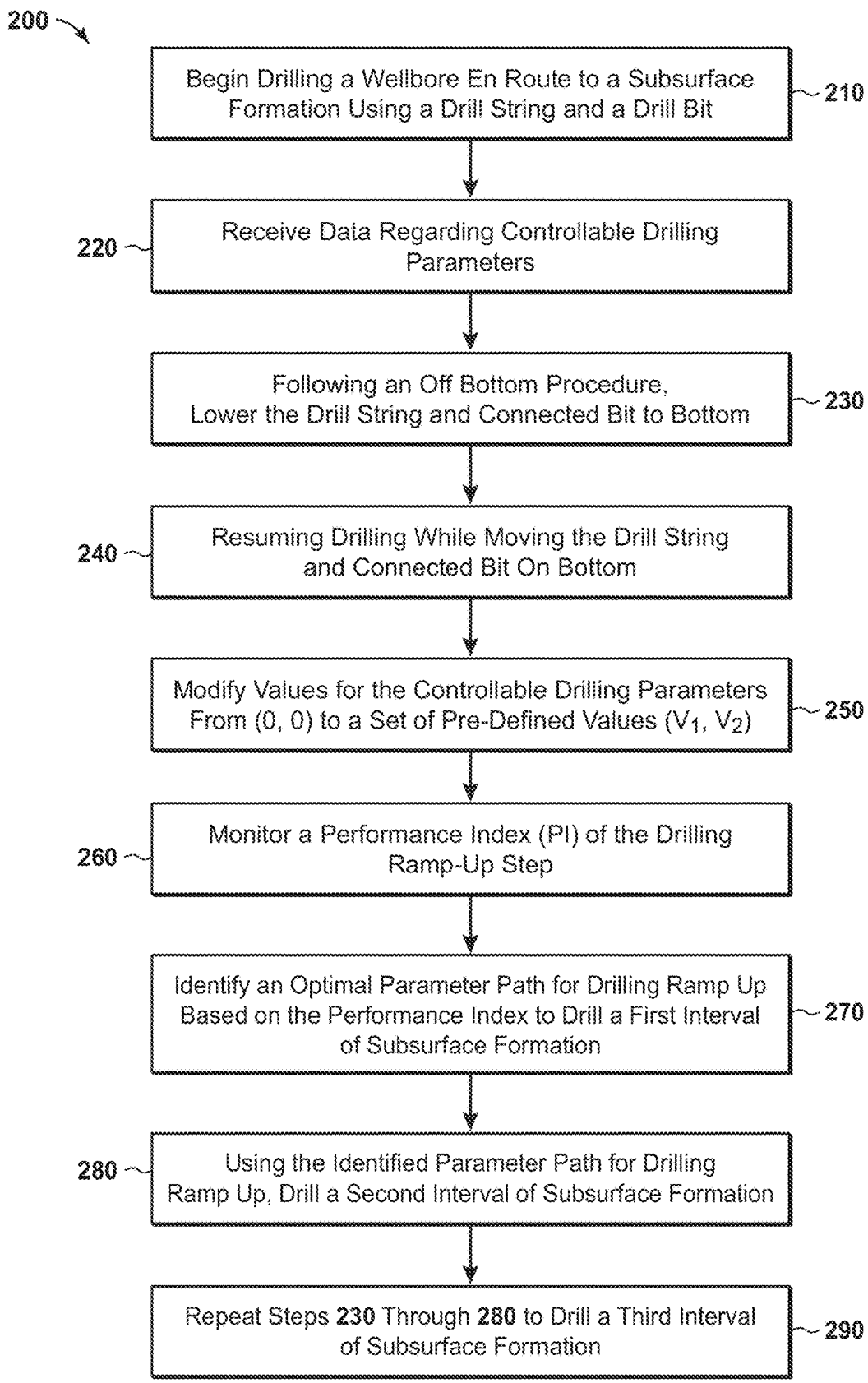
FIG. 2 represents a flow chart showing steps for optimizing a drilling ramp-up operation, in one embodiment.

FIG. 2 is a flow chart generally showing steps for a method 200 of optimizing drilling ramp-up in accordance with the present inventions, in one embodiment. A first step in the method 200 of FIG. 2 is to begin drilling a wellbore. This is shown at Box 210. In the step of Box 210, the driller is forming a wellbore to be completed in a subsurface formation. Drilling is being conducted using a drill string 106 and a BHA 108. It is understood that the drill string 106 is actually a series of pipe joints threadedly connected end-to-end.

A next step is shown in Box 220. In this step, data is received at the drilling rig 102. Such data represents at least two controllable drilling parameters. Those may selected from WOB, RPM, mud flow rate (or "FR"), or other controllable parameters that are part of a wellbore drilling operation. It is to be understood that "receiving data" or "receiving drilling parameters" includes any of various means of deriving information about a drilling parameter. For example, considering the WOB or RPM, a drilling system may record the parameter setpoint provided by the driller using drilling system controls (or using an automated system to accomplish same). Alternatively, a value may be measured by one or more instruments attached to equipment, including both surface instruments and downhole sensors. Alternatively still, the data may be processed by a processor associated with a drilling system to derive or infer one or more parameter values.

As an example, data may be received regarding the drill bit rotation rate, either from the surface equipment or from downhole equipment, or from both surface and downhole equipment. The surface equipment may either provide a controlled rotation rate (setpoint, gain, etc.) as an input to the drilling equipment, or a measured torque and RPM data from which downhole bit rate may be estimated. The downhole bit rotation rate can also be measured and/or calculated using one or more downhole tools. Any suitable technology may be used in cooperation with the step of Box 220 to provide data regarding drilling parameters, provided that the drilling parameters can be used to characterize drilling operations and provided that the drilling parameters are directly or indirectly controllable by an operator.

At some point in the drilling process and while data is being received, the bottom hole assembly will be picked up off-bottom. This may be for the purpose of, for example, adding a section of drill pipe to the drill string. In one aspect, drilling was stopped in order to change out a bit or to repair the bottom hole assembly. In any event, as the drill string is run into the hole, the driller will ultimately lower the drill string and connected bit back on-bottom. This is shown in Box 230 of FIG. 2 as a next step in the method 200.

A next step in the method 200 of optimizing drilling ramp-up is shown in Box 240. Here, the driller resumes drilling while moving the drill string 106 and connected bit back on-bottom. As the driller resumes drilling, controllable drilling parameters such as WOB and RPM will begin to increase. This is referred to as "ramp-up." Controllable drilling parameters will change from (0,0) to pre-defined values $(V_1, V_2)$ that are useful for drilling. Preferably, $(V_1, V_2)$ represent $(WOB^1, RPM^1)$. This is seen at Box 250 of FIG. 2.

It is noted that drilling ramp-up is not limited to activities following new connection make-up, but rather occurs any time the drilling assembly 108 is lifted off-bottom and then returned to bottom. Ramp-up refers specifically to the process of proceeding from a drilling assembly state constituted by zero or near-zero Weight on Bit (WOB) and drill string rotary speed (RPM) (0, 0) to a state where both the WOB and RPM increase.

The $WOB^1$ and $RPM^1$ values may be the parameters used to drill a previous stand of drill pipe, assuming the driller was satisfied with the ROP produced by those values. The $WOB^1$ and $RPM^1$ values may alternatively be determined by reference to drilling logs or records obtained from drilling other wells under similar circumstances or conditions, particularly from the same field. Alternatively, the $WOB^1$ and $RPM^1$ values may be determined by methods to optimize the drilling process as disclosed in U.S. Pat. Nos. 9,482,084 and 9,436,173, also known as a Drilling Advisory System. Operational recommendations are used to optimize an objective function, mitigate dysfunctions, and improve drilling efficiency while the bit is on-bottom.

During the early stages of a drilling ramp-up operation, the drilling assembly will initially contact the bottom of the wellbore with low ROP and zero WOB values. Due to the axial compliance of the drilling assembly, accurate ROP and vibration estimates are typically very difficult to establish just after the bit touches bottom.

It is known in the oil and gas industry that drilling ramp-up operations, if performed improperly, can result in damage to components of the BHA, including not only the drill bit (which itself is very expensive), but also the "point-the-bit" or "push-the-bit" electronics and hardware associated with the BHA. Damage may occur due to excessive lateral, torsional and/or axial vibrations induced by inappropriate drilling ramp-up and ramp-down procedures. Such damage, whether from an individual event or cumulative set of events, may lead to unnecessary costs associated with tripping time, fishing operations and tool replacement charges. In some instances, drilling off-bottom and parameter ramp-up operations may cause sufficient damage to the borehole such that the borehole is lost and requires a sidetrack, with possible loss of drilling tools. It is therefore advantageous to optimize the drilling ramp-up procedure by minimizing drill string and tool vibration.

For this reason, a next step presented in the method 200 is to monitor a Performance Index (PI) during ramp-up. This is shown at Box 260 of FIG. 2. The goal of the step of Box 260 is to mitigate, to the degree possible, various forms of vibrations that may occur during a ramp-up. This, in turn, will improve the overall drilling efficiency and consistency. For this reason, the (PI) represents a combination of torque and RPM which affect vibration.

The method of optimizing drilling ramp-up 200 next includes identifying an optimal parameter path for drilling the first interval. This is seen in Box 270. The optimal parameter path is identified by comparing the predefined values for ($V_1$, $V_2$) to the Performance Index. During this step, controllable drilling parameters are adjusted to achieve new optimized parameters (WOB*, RPM*). These values (WOB*, RPM*) represent an optimal parameter path that is used until the next ramp-up takes place, such as connecting a next 90-foot section of drill pipe. In other words, the parameters are adjusted from $WOB^1$ to WOB*, and from $RPM^1$ to RPM*.

In accordance with the present system, the optimal parameter path may be a WOB and RPM path that minimizes downhole vibration and dysfunction relative to an objective function (Obj). Of course, the optimal drilling parameters are expected to change over the course of drilling as the rock properties of the subsurface formation change. The objection function values may also change with depth.

By way of background, an objective function is a mathematical operation that seeks to either minimize or maximize a value, or a set of values, over a set of feasible alternatives. Where the function seeks to minimize the set of values, it may alternatively be referred to as a cost function. In the present disclosure, the objective function seeks to quantify the process of moving the drilling parameters from initial conditions ($WOB_0$, $RPM_0$), towards ($WOB^1$, $RPM^0$), and then to optimal conditions (WOB*, RPM*).

In one aspect, optimal conditions means that the time (AT) or duration of the ramp-up process is minimized. This represents the time for the driller to progress from the initial conditions ($WOB_0$, $RPM_0$) to the final conditions (WOB*, RPM*). Over the course of numerous ramp-ups during a well drilling operation, this optimizes the overall drilling process.

In another aspect, optimal conditions means that the energy dissipated (primarily in the form of vibrations), along the parameter path of Boxes 260 and 270 is minimized. Stated another way, optimal conditions means that a path of moving from ($WOB_0$, $RPM_0$) to (WOB*, RPM*) that minimizes vibrations is selected. This operates under the premise that energy dissipation causes wear and degradation of the drilling tools. As noted above, a (PI) calculation takes into account both torque (TQ) and rotational rate (RPM). In addition, a (PI) determination may take into account weight on bit (WOB), pipe axial velocity at surface (equal to ROP when the bit is making hole), and bit axial velocity (which may differ from pipe axial velocity when the pipe is being compressed).

In a related aspect, optimal conditions means that the cumulative and/or peak stick-slip vibrations experienced downhole during drilling ramp-up are minimized. Stick-slip vibrations may be determined by the torsional severity estimate (TSE) calculated along the path. Stick-slip is undesirable as it creates rapid wear on polycrystaline diamond cutter bits now frequently used with BHA tools.

Mathematically, the objective function (Obj) may be stated as:
find the time-dependent path $\varphi^*(x(t))$ starting at $x(t_0)$= ($WOB_0$, $RPM_0$) and terminating at $x(t_f)$=(WOB*, RPM*) such that:

Obj(Downhole vibration [$\varphi^*(x(t))$])≥Obj(Downhole vibration [$\varphi(x(t))$]) for all possible paths $\varphi(x(t))$ from $x(0)$ to $x(t_f)$, where:
Obj=is a functional that operates on a path-dependent downhole vibration indicator and returns a real number t=time parameter;

$t_0$=starting time for drilling ramp up;

$t_f$=ending time for drilling ramp up $x(t)$=(WOB(t), RPM(t));

$\varphi(x(t))$=is a time dependent path from $x(t_0)$=($WOB_0$, $RPM_0$) to $x(t_f)$=(WOB*, RPM*);

$\varphi^*(x(t))$=is a time dependent path from $x(t_0)$=($WOB_0$, $RPM_0$) to $x(t_f)$=(WOB*, RPM*) that maximizes Obj.

Note that this equation, formulated as an objective (or "maximization") function, may be similarly expressed as a cost (or "minimization") function. Additionally, and alternatively, the control variables (ROP, RPM) may be used instead of (WOB, RPM) for ROP-controlled operations. Either way, the objective function depends on two controllable variables plus time.

In one embodiment, the objective function is represented by the time integration of a generalized MSE calculation. MSE refers to Mechanical Specific Energy, which is a measure of energy expended by a drilling assembly while drilling an interval of rock (normalized by the volume of rock drilled). MSE correlates with compressive rock strength under efficient drilling conditions and tends to increase in the presence of dysfunction such as lateral vibrations in the bottom hole assembly and bit balling. Thus, an MSE calculation can be a vibration indicator.

In the current arrangement, it is understood that when the bit 108 is off-bottom, the MSE is determined for WOB="0," and a pipe or bit velocity term that replaces ROP.

Two embodiments of a vibration indicator "V" can be utilized. These are defined below in Equations (1a) and (1b):

$$V = \frac{\rho_{TQ,RPM} \cdot TSE}{\mu} \quad (1a)$$

or $$V = \frac{w_1 \rho_{TQ,RPM} + w_2 TSE}{w_3 \mu} \quad (1b)$$

where: V=vibration indicator,
$\rho$=Pearson's correlation coefficient between TQ and RPM,
TQ=surface torque,
RPM=rate of penetration (in revolutions per minute),
$\mu$=bit aggressiveness coefficient,
TSE=torsional severity estimate for downhole stick-slip, and
$w_i$=weighting coefficient which may be defined by the driller.

Each of equations (1a) and (1b) is considered a cost function for determining vibration taking place downhole. In connection with equation 1(b), $w_i$, may be given the coefficient value of 1.

Pearson's correlation coefficient between torque and RPM is mathematically defined by equation (2):

$$\rho_{TQ,RPM} = \frac{\text{cov}(TQ, RPM)}{\sigma_{TQ}\sigma_{RPM}} \quad (2)$$

where: cov=covariance,
σ=standard deviation, and $$\mu = \frac{3TQ}{WOB \cdot d} \quad (3)$$

where: d=bit o.d. or wellbore i.d.

Equations (1a) and (1b) may be rearranged as an objective function as follows:

$$Obj = \frac{1}{\Delta t}\int_{t_0}^{t^*} \left|\frac{\mu}{1+\rho_{TQ,RPM} \cdot TSE}\right| dt \quad (4a)$$

or $$Obj = \frac{1}{\Delta t}\int_{t_0}^{t^*} \left|\frac{w_1 \mu}{1+w_2 \rho_{TQ,RPM} + w_3 TSE}\right| dt \quad (4b)$$

Again, $w_i$, may be given the coefficient value of 1.

Another embodiment of the objective function is a mathematical approach that considers time and differential power between the ideal and actual ramp-ups. The initial power ($P_0$) for rotating the drill string may be expressed as:

$$P_0 = RPM_0 \cdot TQ_0 \quad (5)$$

The final power after ramp-up (P*) may then be expressed as:

$$P^* = RPM^* \cdot TQ^* \quad (6)$$

The ideal path connecting from the initial power state ($P_0$) to the final power state (P*) may be expressed as a linear regression model, wherein Power is a function of WOB, RPM and time. Then, the objective function based on power would be norm-based as set out in equation (7):

$$Obj = \frac{1}{\Delta t}\sqrt{\int_{t_0}^{t^*} [P(WOB, RPM, t) - P^*(WOB, RPM, t)]^2 dt} \quad (7)$$

Where the actual power (P) during the ramp-up is:

$$P(WOB, RPM, t) = RPM(t) \times TQ(WOB, t) \quad (8)$$

and the idealized power would be:

$$P^*(WOB, RPM, t) = RPM(t) \times TQ^*(WOB(t), RPM(t)) \quad (9)$$

In this expression, the ideal surface torque TQ* may be either constructed as a linear fit to the beginning and end point data as:

$$TQ^*(WOB, RPM) = f(WOB_0, WOB^*, RPM_0, RPM^*) \quad (10)$$

or the ideal surface torque TQ* is an estimated torque value based on a Torque/Drag model using field data such as WOB, RPM, axial speed, mud weight, drill string geometry, and wellbore friction factor ($\mu_{w\!f\!f}$). Such an example is demonstrated in diagram 430 discussed below.

Regardless of how the function is expressed, it is desirable to optimize the function by either maximizing the objection function or minimizing the cost function. In one aspect, this involves a series of steps. An example of these steps is outlined in the optimization process 300 of FIG. 3.

Figure 3:
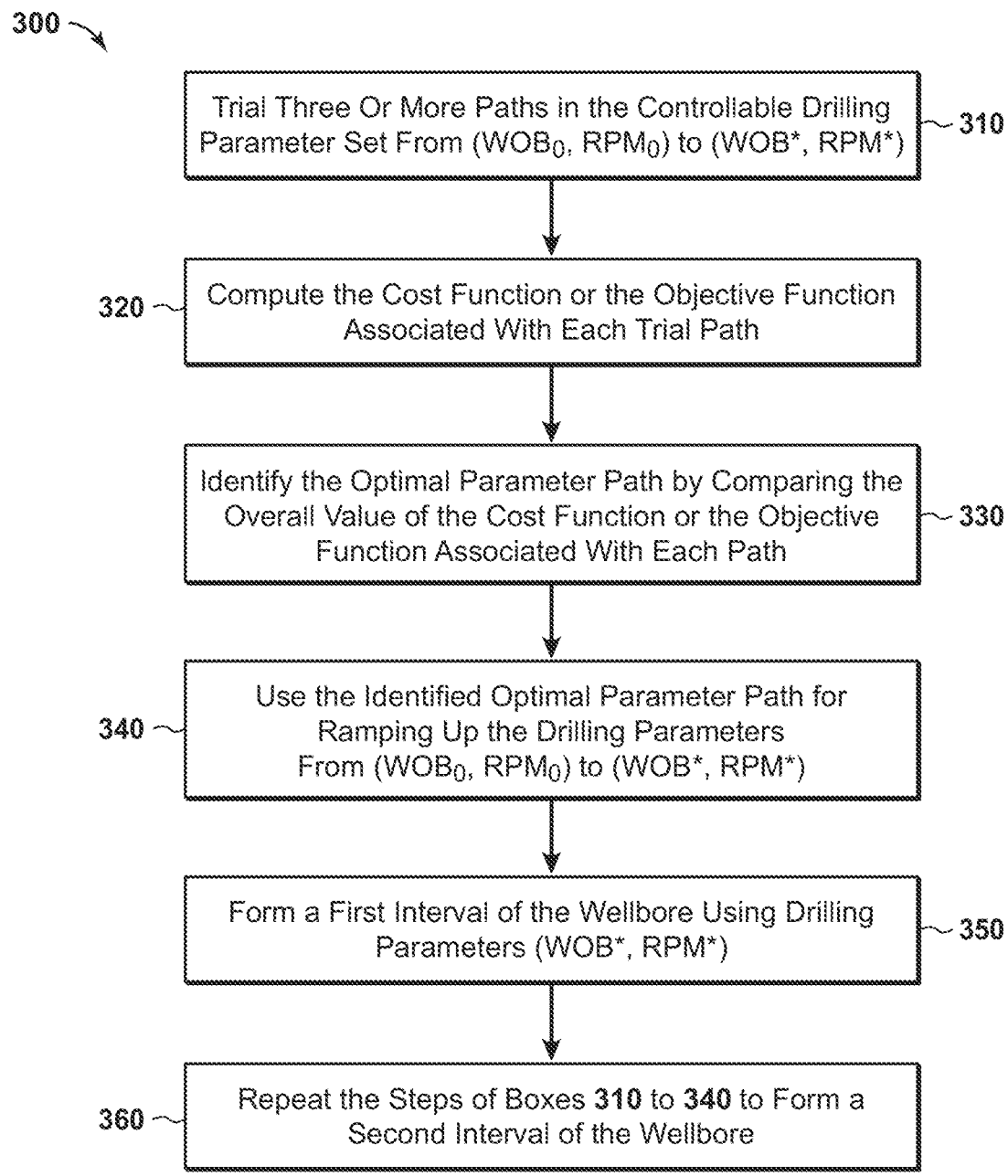
FIG. 3 presents a flow chart showing steps for identifying an optimal parameter path for ramping up drilling parameters, in one embodiment.

In the process 300 of FIG. 3, the drilling software will trial two or more trial paths or, more preferably, three or more paths in the controllable drilling parameter set. For example, the paths will move from ($WOB_0$, $RPM_0$) to (WOB*, RPM*). This is shown in Box 310, and may also be a part of Box 260 described above.

Next, the drilling software will compute the cost function or the objective function for each trial path. This is seen at Box 320. Of interest, this is also a part of Box 260 described above.

Figure 4:
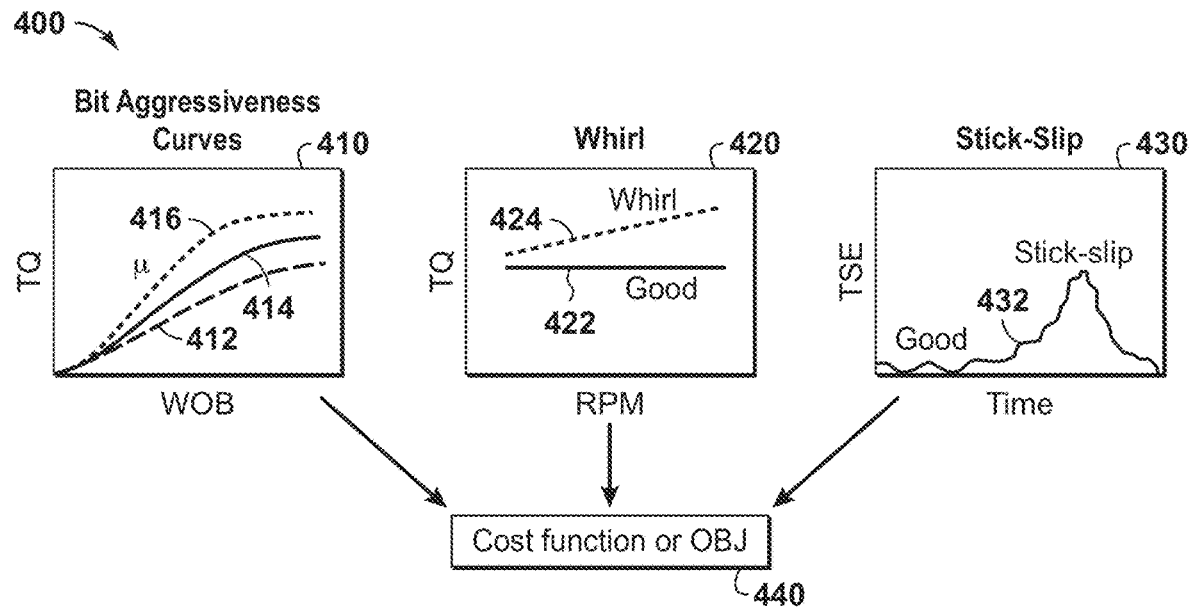
FIG. 4 presents a diagram illustrating techniques for determining a cost function or an objective function.

FIG. 4 presents a diagram illustrating techniques for determining the cost function or the objective function. Specifically, three diagrams 410, 420, 430 are shown. Each of diagrams 410, 420, 430 informs the drilling system of the cost function or objective function 440.

A first diagram 410 offers a Cartesian coordinate wherein weight-on-bit (WOB) is shown along the x-axis while surface torque (TQ) is presented along the y-axis. The diagram presents three separate bit aggressiveness curves 412, 414, 416, each indicating a value (μ). (μ) is essentially a friction factor between the drill bit and the rock face.

A second diagram 420 offers a Cartesian coordinate wherein drill bit rotary speed (RPM) is shown along the x-axis while surface torque (TQ) is presented along the y-axis. The diagram shows two separate lines 422, 424 indicative of "whirl." Those of ordinary skill in the art will understand that "whirl" is a form of undesirable bit vibration. The lower line 424 is the preferred line wherein the level of torque (TQ) remains constant.

A third diagram 430 offers a Cartesian coordinate wherein time (T) is shown along the x-axis while a torque severity estimate (TSE) is presented along the y-axis. The diagram shows a single line 432 indicative of "stick slip." A higher TSE value is indicative of stick slip, or at least a likelihood of stick slip, within the wellbore. It is known that one means of mitigating stick-slip is to increase the surface RPM or to reduce WOB. Thus, to optimize the objective function and reduce the stick-slip at the same time, the operational command created from the drilling system should be one that is compatible with stick-slip mitigation.

The torque severity estimate value may be calculated in real time based on surface data of RPM, pipe torque and bit depth. An equation for TSE is as follows:

$$TSE = \frac{\text{Real Time Torque Swing}}{\text{Theoretical Torque Swing at Full Stick per } RPM \times \text{Surface } RPM}$$
$$\cong \frac{\text{Max Bit } RPM - \text{Ave Bit } RPM}{\text{Ave Bit } RPM}$$

Of interest, a TSE value near zero indicates that there is no stick-slip dysfunction in the drilling system. Likewise, a TSE value of 1 indicates full stick-slip—a condition characterized by the bit periodically coming to a complete stop. For more severe levels of stick-slip, i.e., TSE values above 1, the bit will actually cease to rotate for an interval of "stuck time."

Based on the optimization function employed and the calculated TSE, the drilling software will identify the optimal path for moving from (0, 0) to (WOB*, RPM*). This is indicated at Box 330 of FIG. 3. Identifying the optimal path is done by comparing the overall value of the cost function or objective function associated with each path. This identification step is the same as the step of Box 270.

Figure 5:
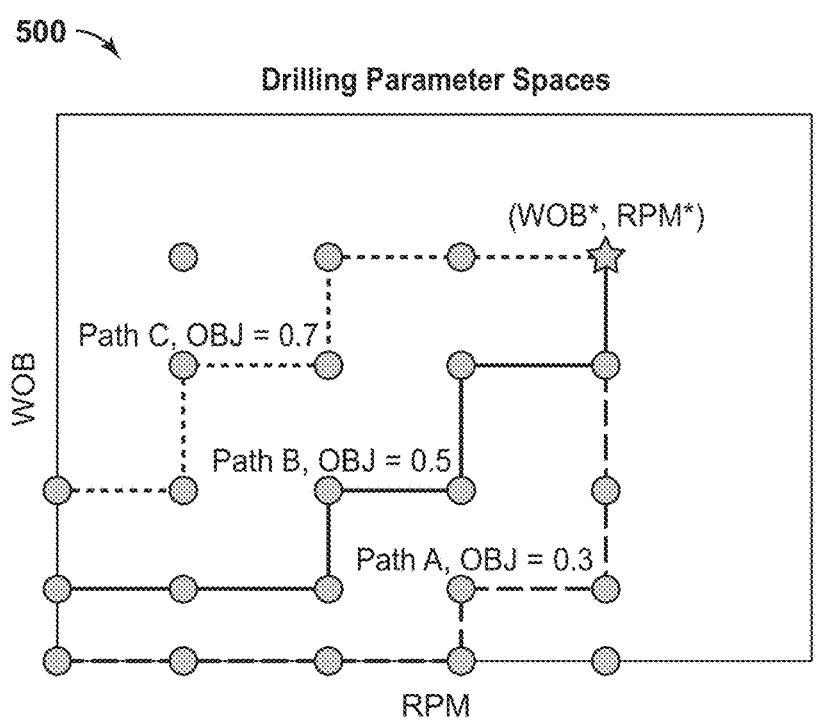
FIG. 5 is an example of constructing different trial paths based on an objective function.

FIG. 5 is an example of constructing different trial paths based on an objective function. Here, a two-dimensional chart 500 is shown, using rate of drill string rotation (RPM) along an x-axis, and using weight-on-bit (WOB) along the y-axis. Three different trial paths are shown, representing Path A, Path B and Path C. Each path seeks to travel from (WOB$_0$, RPM$_0$) to (WOB*, RPM*).

Using the identified parameter Path C, the driller will move from pre-set values (V$_1$, V$_2$) to (WOB*, RPM*). This is provided in Box 340. Returning to FIG. 5, an objective value is shown for each of Paths A, B and C. A higher RPM value indicates higher downhole vibrations and/or high stick slippage. In contrast, a higher WOB area represents a zone having lower downhole vibrations and/or stick slippage. In this case, the optimal ramp-up is to use (WOB, RPM) associated with Path C having a higher object function, i.e. 0.7. In Path C, a higher WOB is used for each RPM value compared to Paths A and B.

The driller will then form a first interval or, alternatively, finish forming the first interval of the wellbore using parameters (WOB*, RPM*). This is shown in Box 350. In connection with the step of Box 350, the driller will use Path C to reach (WOB*, RPM*) until the next off-bottom event occurs.

Once drilling begins again, the driller will seek to drill through a second interval of the wellbore. Here, the driller may choose to re-initiate the optimization process. In this instance, the earlier optimized path (WOB*, RPM*) becomes a new (V$_1$, V$_2$), representing (WOB$^2$, RPM$^2$). Stated another way, the driller will seek to ramp up from (0, 0) to (WOB$^2$, RPM$^2$) as the pre-set target. The steps set forth in Boxes 310 through Box 340 (or Boxes 230 to 270) are then repeated to form a second interval, using a new optimal parameter path (WOB*, RPM*). This is shown at Box 350, and also at Box 280 in FIG. 2.

The step of Box 280 may be repeated to form a third interval along the wellbore. This is shown at Box 290.

Figure 6:
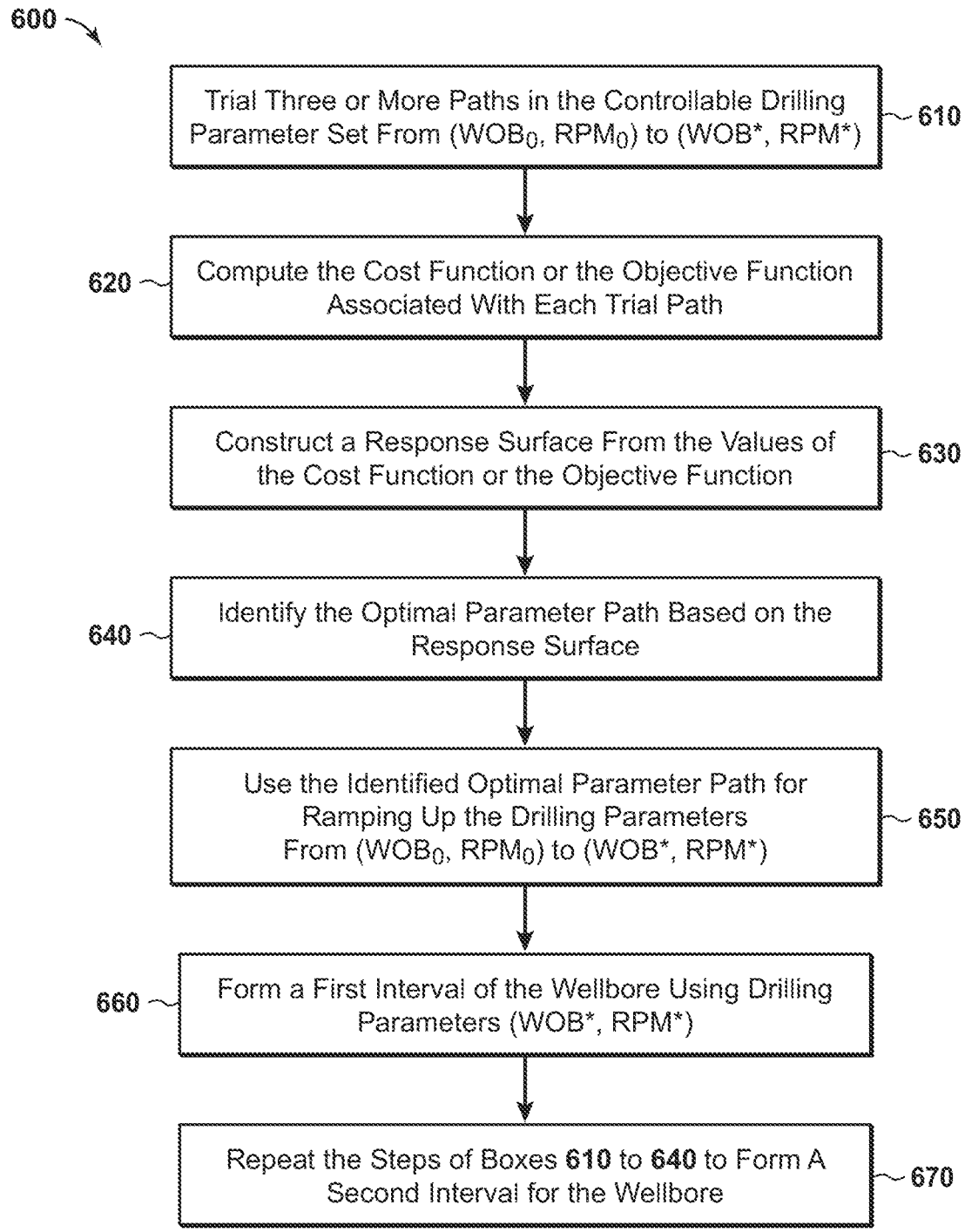
FIG. 6 provides a flow chart showing steps for identifying an optimal parameter path for ramping up drilling parameters, in an alternate embodiment.

FIG. 6 provides an alternate embodiment of optimization of drilling parameters for ramp-up. In this embodiment, the drilling system constructs a response surface based on a set of trial paths and then finds the optimal ramp-up path.

Turning to Box 610, the drilling software will trial two or more paths, and preferably three or more paths in the controllable drilling parameter set. For example, the paths will move from (WOB$_0$, RPM$_0$) to (WOB*, RPM*).

Next, the drilling system will compute the cost function or the objective function for each trial path. This is seen at Box 620.

Thereafter, the drilling system will construct a response surface from the values of the cost function or the objective function. This is provided in Box 630.

Figure 7:
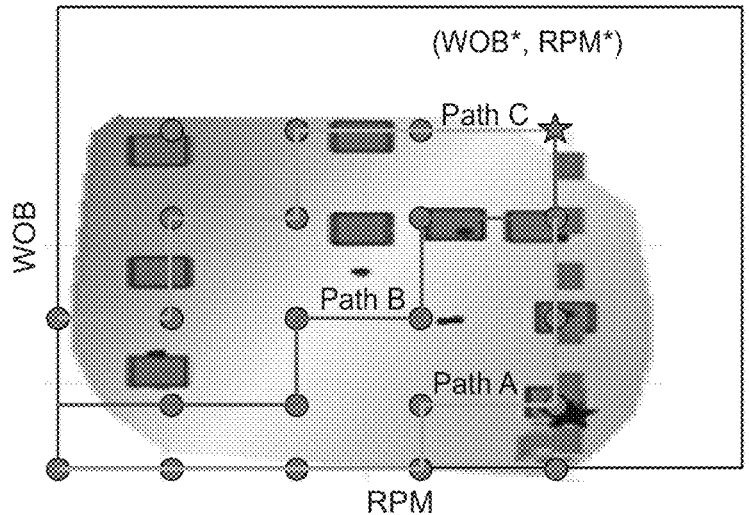
FIG. 7 demonstrates an example of constructing a response surface based on an objective function. Here, the response surface is two-dimensional.

FIG. 7 is an example of constructing a response surface 700 based on an objective function. Here, the response surface is two-dimensional, using rate of drill string rotation (RPM) along an x-axis, and using weight-on-bit (WOB) along the y-axis. Three different trial paths are shown, representing Path A, Path B and Path C. Each path seeks to travel from (WOB$_0$, RPM$_0$) to (WOB*, RPM*).

A response surface may be constructed by collecting real-time data into a moving window. The data is interpolated and an optimal point is determined. The response surface may be constructed by a regression analysis method such as least squares regression, or any interpolation method including quadratic interpolation, higher order polynomial interpolation or Delaunary triangulation. With the constructed surface, the optimal point can be found immediately.

As a next step, the drilling system will find, or identify, an optimal parameter path for ramping up the drilling parameters. This is provided at Box 640. Returning to FIG. 7, a color scheme is presented in the response surface. The orange area represents a zone having higher downhole vibrations and/or high stick slippage. In contrast, the green area represents a zone having lower downhole vibrations and/or stick slippage. In this case, the optimal ramp-up is to use the (WOB, RPM) path associated with Path A because it covers the most green area.

It is noted that while FIG. 7 demonstrates a two-dimensional response surface informed by color, it is also known within the field of machine learning to use three-dimensional response surfaces. U.S. Pat. No. 9,436,173, previously discussed, mentions the use of an objective function with respect to controllable drilling parameters in both a 3-D surface and a hyperplane in N-dimensional space. The objective function may be developed using any regression or interpolation methods to find an optimal point from the response surface.

In any instance, the driller will then form a first interval or, more accurately, finish forming the first interval of the wellbore using parameters (WOB*, RPM*). This is shown in Box 650. In connection with the step of Box 650, the driller will use Path A to reach (WOB*, RPM*) until the next off-bottom event occurs.

Optionally, after a next off-bottom operation, the steps of Boxes 610 through 650 will be repeated to form a second interval in the wellbore. Here, the driller may choose to re-initiate the optimization process. In this instance, the earlier optimized path (WOB*, RPM*) becomes a new (V$_1$, V$_2$), representing (WOB$^2$, RPM$^2$). Stated another way, the driller will seek to ramp up from (0, 0) to (WOB$^2$, RPM$^2$) as the pre-set target. This is shown at Box 660.

Once the new section of drill pipe is connected, or once some other ramp-up or ramp-down operation has begun, the operator will use the identified optimal parameter path (WOB*, RPM*) to begin drilling a second interval of the subsurface formation. This is provided in Box 340 of FIG. 3. This is also expressed in Box 270 of FIG. 2.

It is observed that the same process used for drilling ramp up, that is, moving from (WOB$_0$, RPM$_0$) to (WOB*, RPM*) may be used for ramp down, that is, moving from (WOB*, RPM*) to (WOB$_0$, RPM$_0$). In this instance, the driller or operator transitions from optimized weight-on-bit and rotary speed to a point where the bit is "off bottom."

It is certainly possible for the driller to just pick the bit up off bottom while the drill bit is still rotating and then bring the bit to a static condition. However, a more optimized approach would be to use an objective function or a cost function to reduce weight-on-bit and rotary speed together in order to minimize downhole vibration and dysfunction. Preferably, drilling software is used to identify an optimal path. This is done by comparing the overall value of a cost function or an objective function associated with one of several paths to (WOB$_0$, RPM$_0$).

It is understood that the drilling system referenced herein comprises a computer-based system for use in association with drilling operations. The computer-based system may be a computer system, or it may be a network-based computing system, and/or it may be a computer integrated into equipment at the drilling site. The computer-based system seeks to provide an optimal path with minimum MSE and TSE values in order to provide higher ROP and to reduce the risk of unnecessary trips due to premature bit and tool wear.

Figure 8:
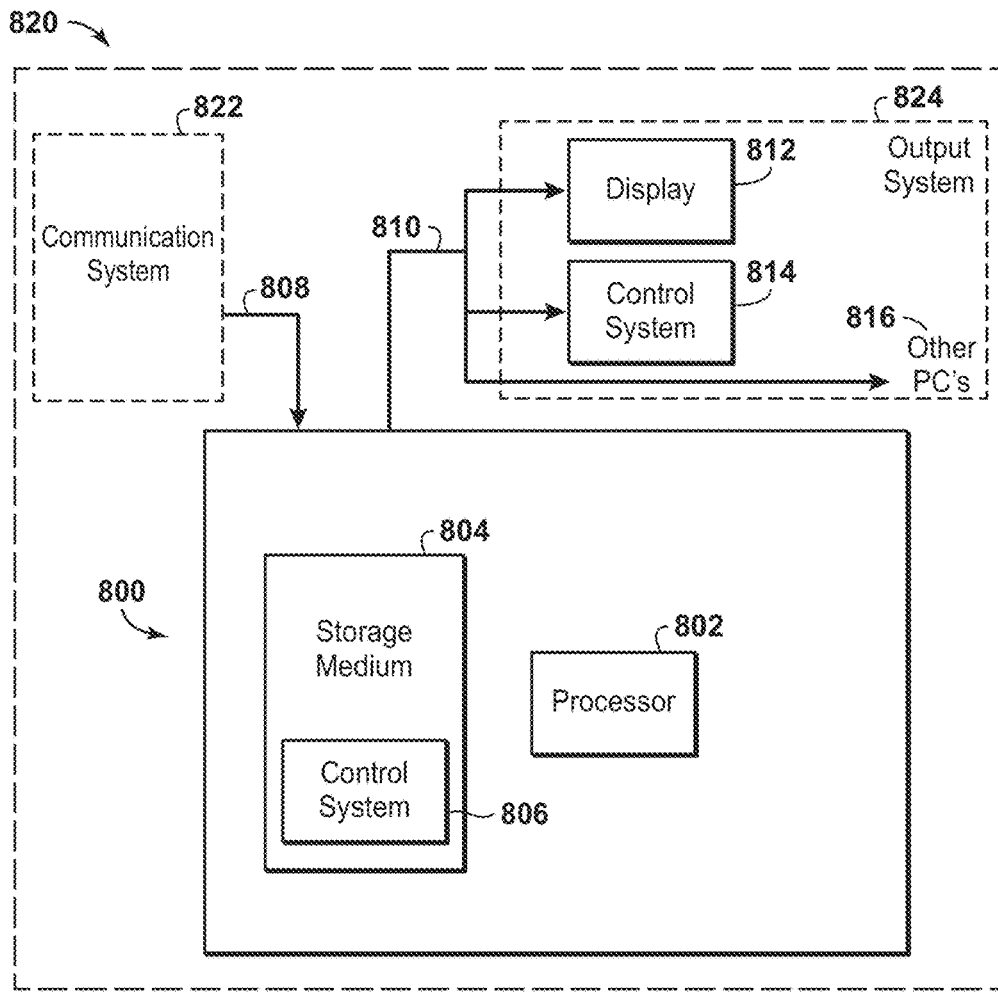
FIG. 8 is a schematic illustration of a computer-based system for use in a drilling operation.

FIG. 8 presents an illustrative computer-based system 800 for use in a drilling operation. The computer-based system 800 comprises a processor 802, a storage medium 804, and at least one instruction set 806. The processor 802 is adapted to execute instructions and may include one or more processors now known or future developed that is used in computing systems. The storage medium 804 is adapted to communicate with the processor 802 and to store data and other information, including the at least one instruction set 806. The storage medium 804 may include various forms of electronic storage mediums, including one or more storage mediums in communication in any suitable manner.

The selection of appropriate processor(s) and storage medium(s) and their relationship to each other may be dependent on the particular implementation. For example, some implementations may utilize multiple processors and an instruction set adapted to utilize the multiple processors so as to increase the speed of the computing steps. Alternatively or in addition, some implementations may be based on a sufficient quantity or diversity of data that multiple storage mediums are desired or storage mediums of particular configurations are desired. Alternatively still, one or more of the components of the computer-based system 800 may be located remotely from the other components and be connected via any suitable electronic communications system. For example, some implementations of the present systems and methods may refer to historical data from other wells, which may be obtained in some implementations from a centralized server connected via networking technology.

The at least one instruction set 806 for the computer-based system 800 is adapted to perform the steps of the methods set forth in FIGS. 2, 3 and 6 as described above. As illustrated, the computer-based system 800 receives data at data input 808 and exports data at data export 810. The data input and output ports can be serial port (DB-9 RS232), LAN or wireless network, etc. The at least one instruction set 806 is adapted to export the generated operational recommendations for consideration in controlling drilling operations. In some implementations, the generated operational recommendations may be exported to a display 812 for consideration by a user, such as a driller. In other implementations, the generated operational recommendations may be provided as an audible signal, such as up or down chimes of different characteristics to signal a recommended increase or decrease of WOB, RPM, or some other drilling parameter. Preferably, an ethernet connection is provided, enabling the delivery of drilling recommendations generated by the optimization functions to a remote engineer in real time.

In one aspect, the generated operational recommendations may be exported to a control system 814 adapted to determine at least one operational update. The control system 814 may be integrated into the computer-based system or may be a separate component. Additionally or alternatively, the control system 814 may be adapted to implement at least one of the determined updates during the drilling operation, automatically, substantially automatically, or upon user activation.

The computer-based system 800 operates in conjunction with a drilling rig system 820. The illustrative drilling rig system 820 includes a communication system 822 and an output system 824. The communication system 822 may be adapted to receive data regarding at least two drilling parameters relevant to ongoing drilling operations. The output system 824 is adapted to communicate the generated operational recommendations and/or the determined operational updates for consideration in controlling drilling operations.

The communication system 822 preferably receives data from other parts of an oil field, from the rig and/or wellbore, and/or from another networked data source, such as the Internet. The output system 824 may be adapted to include displays 812, printers, control systems 814, other computers 816, network at the rig site, or other means of exporting the generated operational recommendations and/or the determined operational updates.

As can be seen, an improved method or modeling system for optimizing drilling ramp-up is provided. Controllable drilling parameters such as WOB, RPM and Mud Flow Rate (FR) are tuned to minimize Mechanical Specific Energy. As noted above, several workflows or tools have been used to seek optimal values during when progressing to on-bottom drilling such as the implementation of set points determined through the use of a computer aided system (either automated or advisory). In one aspect, the objective is to sample controllable drilling parameters at a number of reasonable set point values to determine combinations of controllable drilling parameters that enhance drilling Rate of Penetration (ROP) and reduce downhole dysfunction.

Downhole dysfunction may be identified by processing raw time-based surface sensor data (i.e., sensors instrumented on surface equipment) to compute Mechanical Specific Energy (MSE), Torsional Severity Estimate (TSE), ROP and Bit Friction Coefficient (p). Downhole dysfunction can also be identified from downhole sensors measuring various modes of vibration, if they are available. The goal is to find an optimal set of controllable drilling parameters that enhances rate of penetration (ROP), lowers MSE (Mechanical Specific Energy), and mitigates downhole dysfunction during the drilling of a first interval (or segment) of a subsurface formation.

Further variations of the method may fall within the spirit of the claims, below. It will be appreciated that the inventions are susceptible to modification, variation and change without departing from the spirit thereof.

What is claimed is:

1. A method of operating a drilling rig, comprising:
 (a) drilling an interval of a wellbore en route to a subsurface formation using a drilling string and a drill bit, the drill bit drilling on a bottom of the wellbore;
 (b) during the drilling on the bottom of the wellbore, receiving data representing at least two controllable drilling parameters selected from weight on bit (WOB), revolutions per minute (RPM) and flow rate (FR);
 (c) after receiving the data
  (i) ceasing drilling on the bottom and raising the drill bit off the bottom, and
  (ii) lowering the drill string to the bottom of the wellbore and initiating a drilling ramp-up to drilling with the bit on the bottom;
 (d) the ramp-up comprising modifying values for the at least two controllable drilling parameters from an initial (0,0) value when initiating the drilling ramp-up to a selected set of the at least two desired parameter values ($V_1^*$, $V_2^*$) at a return to drilling on the bottom;
 (e) determining and monitoring a performance index (PI) of the drilling ramp-up step (d), the determining the performance index including using received data representing a combination of torque (TQ) and RPM;
 (f) using the Performance Index (PI), identifying a parameter path ($V_1$, $V_2$) to the desired parameter values ($V_1^*$, $V_2^*$) for drilling ramp-up for drilling another interval of the wellbore; and
 (g) further ramping up to the desired parameter values ($V_1^*$, $V_2^*$) via the parameter path ($V_1$, $V_2$) to drill the another interval of the wellbore;

wherein the performance index comprises a cost function, wherein the cost function comprises at least one of:

$$V = \frac{\rho_{TQ,RPM} \cdot TSE}{\mu}$$

or $$V = \frac{w_1 \rho_{TQ,RPM} + w_2 TSE}{w_3 \mu}$$

where: V=vibration indicator,
TQ=surface torque,
TSE=torsional severity estimate for downhole stick-slip,
RPM=revolutions per minute,
µ=bit aggressiveness coefficient,
$w_i$=weighting coefficient defined by the user, and
ρ=Pearson's correlation coefficient between TQ and RPM, defined as $$\rho_{TQ,RPM} = \frac{cov(TQ, RPM)}{\sigma_{TQ} \sigma_{RPM}}$$

where: cov=covariance,
σ=standard deviation, and
µ=bit aggressiveness coefficient defined as:

$$\mu = \frac{3TQ}{WOB \cdot d}$$

where: d=bit O.D. or wellbore I.D.

2. The method of claim 1, wherein:
the drill bit is part of a bottom hole assembly that comprises control electronics for directional drilling; and
the method further comprises:
(h) using the desired parameter values ($V_1^*$, $V_2^*$) from the first interval as a new set of desired parameter values ($V_1^*$, $V_2^*$) for drilling a second interval of the wellbore; and
(i) repeating steps (d) through (f) to drill the second interval.

3. The method of claim 1, wherein the selected set of desired parameter values ($V_1^*$, $V_2^*$) in step (d) are determined by at least one of (i) manually set by a drilling crew, (ii) values determined to be acceptable from drilling a previous joint of drill pipe, (iii) values determined to be acceptable from drilling a separate well and (iv) recommended values from a drilling advisory system.

4. The method of claim 1, wherein identifying the parameter path of step (f) for the drilling the another interval comprises constructing a response surface based on either a cost function or an objective function to determine the parameter path.

5. The method of claim 1, wherein:
the drill bit is part of a bottom hole assembly that comprises control electronics for directional drilling; and
the method further comprises:
(h) updating the desired parameter values ($V_1^*$, $V_2^*$) for drilling a second interval of the wellbore; and
(i) repeating steps (d) through (f) to drill the second interval.

6. The method of claim 5, wherein the updating the desired parameter values ($V_1^*$, $V_2^*$) in step (h) are determined by at least one of (i) manually set by a drilling crew, (ii) values determined to be acceptable from drilling a previous joint of drill pipe, (iii) values determined to be acceptable from drilling a separate well and (iv) recommended values from a drilling advisory system.

7. The method of claim 1, wherein the performance index further comprises an objective function.

8. The method of claim 7, wherein the objective function comprises at least one of:

$$Obj = \frac{1}{\Delta t} \int_{t_0}^{t*} \left| \frac{\mu}{1 + \rho_{TQ,RPM} \cdot TSE} \right| dt$$

or $$Obj = \frac{1}{\Delta t} \int_{t_0}^{t*} \left| \frac{w_1 \mu}{1 + w_2 \rho_{TQ,RPM} + w_3 TSE} \right| dt$$

or $$Obj = \frac{1}{\Delta t} \sqrt{\int_{t_0}^{t*} [P(WOB, RPM, t) - P*(WOB, RPM, t)]^2 \, dt}$$

where $w_i$=a weighting coefficient;
TSE=torsional severity estimate for downhole stick-slip,
WOB=weight on bit;
TQ=surface torque;
RPM=revolutions per minute;
t=time;
ρ=Pearson's correlation coefficient between TQ and RPM; and
P=power.

9. The method of claim 8, wherein:
an initial power state ($P_0$) during the ramp-up is:

$$P(WOB,RPM,t)=RPM(t) \times TQ(WOB,t)$$

and an idealized power (P*) is:

$$P*(WOB,RPM,t)=RPM(t) \times TQ*(WOB(t),RPM(t))$$

where TQ*=idealized torque.

10. The method of claim 9, wherein TQ* is constructed as at least one of:
a linear fit to the beginning and end point data as;

$$TQ*(WOB,RPM)=f(WOB_0,WOB*,RPM_0,RPM*)$$

and
an estimated torque value based on a Torque/Drag model using at least field data including WOB, RPM, mud weight, drill string geometry, and wellbore friction factor.

11. The method of claim 7, wherein the identifying the desired parameter path of step (f) for drilling the another interval comprises finding at least one of a minimum cost function value and a maximum objective function value among at least two ramp-up trial paths to determine the parameter path.

12. The method of claim 11, wherein determining the optimal parameter path comprises:
computing at least one of the cost function and the objective function associated with each trial path; and
identifying the parameter path by comparing at least one of an overall value of the cost function and the objective function associated with each path.

13. The method of claim 7, wherein the at least one of the selected cost function and the objective function is based upon at least one of a surface torque, a torsional severity estimate, a bit friction coefficient, and combinations thereof to calculate a vibration indicator.

14. The method of claim 1, further comprising:
after drilling the another interval, moving the drilling parameter values from the desired parameter values $(V_1^*, V_2^*)$ back to the initial (0,0) value according to an optimized ramp down parameter path.

15. The method of claim 14, wherein the optimized ramp down parameter path is identified by comparing at least one of an overall value of a selected cost function and an objective function associated with one of at least two paths to the initial (0,0) value.

16. A system for operating a drilling rig, the system including:
a drilling rig for drilling a wellbore, including a drill string and a rotatable drill bit;
a control system coupled to the drilling rig, wherein the control system comprises a processor and a non-transitory data storage computer readable data storage medium comprising computer readable instructions configured to direct the processor to;
receive data while drilling an interval of the wellbore with the drill bit on a bottom of the wellbore, the data representing at least two controllable drilling parameters selected from weight on bit (WOB), revolutions per minute (RPM), and flow rate (FR);
subsequent to receiving the data,
(i) ceasing drilling on the bottom and raising the drill bot off the bottom, and
(ii) lowering the drill string to the bottom of the wellbore and initiating a drilling ramp-up to drilling with the bit on the bottom;
modify values for the at least two controllable drilling parameters from an initial (0,0) value when initiating the drilling ramp-up to a selected set of the at least two desired parameter values $(V_1^*, V_2^*)$ at a return to drilling on the bottom;
determining and monitoring a performance index (PI) of the drilling ramp-up, the determining of the performance index including using received data representing a combination of torque (TQ) and RPM;

using the Performance Index (PI), identifying a parameter path $(V_1, V_2)$ to the desired parameter values $(V_1^*, V_2^*)$ for drilling ramp-up for drilling the another interval of the wellbore; and
further ramping-up to the desired parameter values $(V_1^*, V_2^*)$ via the parameter path $(V_1, V_2)$ to drill the another interval of the wellbore;
wherein the performance index comprises a cost function, wherein the cost function comprises at least one of:

$$V = \frac{\rho_{TQ,RPM} \cdot TSE}{\mu}$$

or $$V = \frac{w_1 \rho_{TQ,RPM} + w_2 TSE}{w_3 \mu}$$

where: V=vibration indicator,
TQ=surface torque,
TSE=torsional severity estimate for downhole stick-slip,
RPM=revolutions per minute,
$\mu$=bit aggressiveness coefficient,
$w_i$=weighting coefficient defined by the user, and
$\rho$=Pearson's correlation coefficient between TQ and RPM, defined as $$\rho_{TQ,RPM} = \frac{\text{cov}(TQ, RPM)}{\sigma_{TQ} \sigma_{RPM}}$$

where: cov=covariance,
$\sigma$=standard deviation, and
$\mu$=bit aggressiveness coefficient defined as:

$$\mu = \frac{3TQ}{WOB \cdot d}$$

where: d=bit O.D. or wellbore I.D.

* * * * *